(12) United States Patent
Teramoto et al.

(10) Patent No.: US 9,458,328 B2
(45) Date of Patent: Oct. 4, 2016

(54) EMULSION PAINT TYPE DAMPING COATINGS

(75) Inventors: Masazumi Teramoto, Toyota (JP); Hirotaka Maeda, Toyota (JP); Junichi Kawai, Toyota (JP); Yutaka Ohashi, Toyota (JP)

(73) Assignees: AISIN KAKO KABUSHIKI KAISHA, Aichi-ken (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 526 days.

(21) Appl. No.: 12/600,933

(22) PCT Filed: May 20, 2008

(86) PCT No.: PCT/JP2008/059618
§ 371 (c)(1),
(2), (4) Date: Nov. 19, 2009

(87) PCT Pub. No.: WO2008/146771
PCT Pub. Date: Dec. 4, 2008

(65) Prior Publication Data
US 2010/0160495 A1    Jun. 24, 2010

(30) Foreign Application Priority Data
May 23, 2007  (JP) .................................. 2007-136461

(51) Int. Cl.
*C09D 5/02* (2006.01)

(52) U.S. Cl.
CPC .................. *C09D 5/028* (2013.01); *C09D 5/02* (2013.01)

(58) Field of Classification Search
CPC ................ C08K 3/0033; C09D 5/028; C09D 123/0853
USPC ........................................................ 523/400
See application file for complete search history.

(56) References Cited

U.S. PATENT DOCUMENTS 5,952,404 A * 9/1999 Simpson et al. ............... 523/221
6,376,570 B1 * 4/2002 Zhao et al. ....................... 522/42

(Continued)

FOREIGN PATENT DOCUMENTS

CN           1323863 A  * 11/2001
CN           1323864 A  * 11/2001

(Continued)

OTHER PUBLICATIONS

English language machine translation of JP 06-048236. Japanese document published Feb. 22, 1994. Printed Dec. 14, 2011.*

(Continued)

*Primary Examiner* — Michael A Salvitti
(74) *Attorney, Agent, or Firm* — Sughrue Mion, PLLC

(57) ABSTRACT

Emulsion paint type damping coatings show an excellent film forming property even if it leaves at low temperature from 5 to 20° C. It does not generate a defective coated film like swellings after baking drying and brings out an excellent damping performance within a range of 20 to 60° C. That is, it contains one or more than two kinds of organic chemicals within a range of 0.5% to 5% by weight in total and the MFT, the minimum film forming temperature of the entire resin emulsion is within a range of 5 to 15° C. and the boiling point for a film forming assistant is within a range of 150 to 240° C., thus, it enables to obtain an excellent film forming property at 5° C. and even in baking drying and does not generate a defective coated film like swellings as well. As a result, emulsion paint type damping coatings bring out an excellent damping performance within a range of 20 to 60° C.

5 Claims, 2 Drawing Sheets

(56) References Cited

U.S. PATENT DOCUMENTS

| | | | |
|---|---|---|---|
| 6,645,586 B2 | 11/2003 | Ohira et al. | |
| 6,646,042 B2* | 11/2003 | Wu et al. | 524/560 |
| 6,686,033 B1* | 2/2004 | Chacko | 428/221 |
| 2004/0072943 A1* | 4/2004 | Morihiro et al. | 524/556 |
| 2004/0220314 A1* | 11/2004 | Suzuki et al. | 524/425 |
| 2006/0189734 A1* | 8/2006 | Gota et al. | 524/379 |
| 2007/0010599 A1* | 1/2007 | Grass et al. | 523/160 |
| 2007/0032586 A1* | 2/2007 | Numazawa et al. | 524/448 |
| 2007/0269650 A1* | 11/2007 | Leuninger et al. | 428/327 |
| 2008/0153969 A1* | 6/2008 | Hermes et al. | 524/500 |
| 2009/0286933 A1* | 11/2009 | Nagaishi et al. | 524/832 |
| 2010/0160495 A1* | 6/2010 | Teramoto et al. | 523/400 |

FOREIGN PATENT DOCUMENTS

| | | |
|---|---|---|
| JP | 06-048236 A | 2/1994 |
| JP | 09-151335 A | 6/1997 |
| JP | 10-195339 A | 7/1998 |
| JP | 11-334653 A | 12/1999 |
| JP | 2001-064545 A | 3/2001 |
| JP | 2001-152028 A | 6/2001 |
| JP | 2002-053817 * | 2/2002 |
| JP | 2002-294164 A | 10/2002 |
| JP | 2003-003125 A | 1/2003 |
| JP | 2003-042223 A | 2/2003 |
| JP | 2004-115665 A | 4/2004 |
| JP | 2001-152028 * | 6/2005 |
| JP | 2007-039656 A | 2/2007 |

OTHER PUBLICATIONS

English language machine translation of JP 2007-039656. Japanese document published Feb. 15, 2007. Printed Dec. 14, 2011.*

Brock et al. European Coatings Handbook. © 2000. p. 68. Citation obtained from http://www.books.google.com on Jul. 19, 2012.*

English machine translation of JP 2001-152028 to Aizawa. Obtained from JPO/AIPN website on Mar. 23, 2014.*

Scifinder Abstract of CN 1323863 to Liao. Obtained on May 17, 2015.*

English Translation of CN 1323864A to Liao. Obtained from Google Translation of Jan. 23, 2015.*

Japanese Translation of JP 2002-053817 to Fujinami et al. Obtained from the AIPN/JPO website on Jan. 23, 2015.*

* cited by examiner

EMULSION PAINT TYPE DAMPING COATINGS

TECHNICAL FIELD

This present invention relates to water emulsion paint type damping coatings that contain a resin emulsion and an inorganic filler. It is excellent in stiffness and damping performance used in a floor portion of a vehicle or the like and superior in film forming property at low temperature as well.

At this point, emulsion is something emulsified (a kind of dispersed system) that a liquid particle is larger than a colloidal particle or a coarse-grained particle in a liquid. This is the original meaning of "emulsion" that is referred to clause 152 of Iwanami Physics and Chemistry Dictionary, the fifth edition edit by Saburo Nagakura, published by Iwanami Shoten Publishing Ltd., at 20 Feb. 1998. In this description, claims, drawings and abstract, the word "emulsion" is generally used as "solid or liquid particles that are suspended in a liquid" in much broader meanings.

BACKGROUND ART

So far, to eliminate a vibration, a sheet-like damping material mainly made of asphalt was attached to a floor portion of a vehicle or the like. However, in case such a sheet-like damping material is used in a vehicle or the like, it needs to cut off along the shape of a portion that is set at each vehicle. Furthermore, as it needs to set such a sheet-like damping material by workers, it interferes with an automated construction and prevented reduction of the process time. Therefore, as shown in a patent publication No. 1, it has invented a damping material (a water damping emulsion) that enables an automated construction by a robot.

In a patent publication No. 1, there is described an invention of a water damping emulsion that a solidification rate is controlled in a fixed range when drying a thick coated film that is coated over for a damping material. This is so as to prevent swellings or cracks on a coated film when moisture of inside the coated film is evaporated drying from the surface and strengthening it and to improve a drying property of a coated film that is formed for a damping material.

According to the previous invention, a water damping emulsion enables an automated construction by a painting robot. As it is water paint, it is possible not only to shorten process time but also to obtain following merits that it does not emit a smell of asphalt in the former sheet-like damping material and does not emit a smell of organic solvent coatings under the construction as well. However, in case a vehicle floor or the like applying such a water paint according to the previous invention is left at less than 20° C. low temperature, there took place a problem that generated splits or cracks on a coated film since it was bad in its film forming property at low temperature.

Therefore, in a patent publication No. 2, there is described an invention of a water damping material that is added to compatibility adjuster like various solvents, a rosin ester, a phenol resin and so on to improve a film forming property at low temperature.

Patent Application No. 1: Pat. Appln. 2004-115665
Patent Application No. 2: Pat. Appln. 2001-152028

DISCLOSURE OF THE INVENTION

Problems that the Invention is to Solve

However, in a water damping material emulsion according to above patent publication No. 2, only when the temperature is within a range of 10 to 20° C., it enables to obtain an improved effect in a film forming property. Concretely, in case it uses a propylene glycol, a rosin ester and a phenol resin for an addition, it is already inadequate in film forming property at 10° C. In case of using a texanol (2,2,4-trymethyl-1,3-pentane diol mono (2-methylpropanate) at 10° C., it can obtain a film forming property, but when trying to obtain enough film forming property at 5° C., there took place problems that it affected on damping performance and generated swellings at ustulation since the boiling point of a texanol was too high 255° C.

Therefore, in this present invention, it is an object to provide an excellent emulsion paint type damping coating that shows the following properties: even if it leaves at low temperature from 5 to 20° C. in after coating to before ustulation, it shows an excellent film forming property and does not generate splits or cracks on a coated film; it does not generate a defective coated film like swellings in a subsequent baking drying as well; it brings out an excellent damping performance within a range of 20 to 60° C.

Means to Solve the Problem

According to claim 1, emulsion paint type damping coatings contain one or more than two kinds of the following components each; a resin emulsion, a film forming assistant and an inorganic fillers wherein the resin emulsion is one or more than two kinds of the following components: an acrylic resin (including methacryl resin) emulsion, an acrylic ester resin (including methacrylic ester resin) emulsion, an acryl-styrene resin emulsion, a styrene-butadiene resin emulsion, a styrene-butadiene-latex emulsion, a vinyl acetate resin emulsion, an ethylene-vinyl acetate resin emulsion, an ethylene-acryl resin emulsion, an epoxy resin emulsion, an urethane resin emulsion, a phenol resin emulsion, a polyester resin emulsion and an acrylonitrile-butadiene-latex emulsion, and the MFT, the minimum film forming temperature of above-described entire resin emulsion is within a range of 5 to 15° C. and it contains one or more than two kinds of organic chemicals which boiling point is within a range of 150 to 240° C. for above-described a film forming assistant in total 0.5% to 5% by weight.

Also, regarding an organic chemical for a film forming assistant, it is available to use one or more than two kinds of following ethers, esters, glycols, glycol ethers or alcohols: an ethylene glycol mono-t-butyl ether, a diethylene glycol mono butyl ether, a diethylene glycol mono ethyl ether, an ethylene glycol mono propyl ether, a dimethyl dicarboxylate, a di-propylene glycol n-butyl ether, a 3-methyl-3-methoxy butanol, a propylene glycol, a 2-butoxy ethanol and so on.

Moreover, for an inorganic filler, it is able to use a calcium carbonate, a magnesium carbonate, a barium sulfate, a clay, a talc, a mica, a diatomaceous earth, an aluminous, a gypsum, a cement, a slag powder, a white sand sediment powder, a glass powder, a graphite, a vermiculite, a kaolinite, a zeolite and so on.

Emulsion paint type damping coatings according to claim 2 are chosen at least one from above-described film forming assistant in composition of claim 1: an ethylene glycol mono-t-butyl ether, an ethylene glycol mono propyl ether, a dimethyl dicarboxylate, a di-propylene glycol n-butyl ether, a 3-methyl-3-methoxy butanol, a propylene glycol and a 2-butoxy ethanol.

Emulsion paint type damping coatings according to claim 3 are chosen at least one from above-described inorganic filler in composition of claim 1 to claim 2: a calcium carbonate, a magnesium a carbonate, a barium sulfate, a clay, a talc, a mica, a diatomaceous earth, an aluminous, a gypsum, a cement, a slag powder, a white sand sediment powder, a glass powder, a graphite, a vermiculite, a kaolinite and a zeolite.

Effects of the Invention

Emulsion paint type damping coatings according to claim 1 contain one or more than two kinds of the following components each: a resin emulsion, a film forming assistant and an inorganic filler wherein the resin emulsion is one or more than two kinds of the following components: an acrylic resin (including methacryl resin) emulsion, an acrylic ester resin (including methacrylic ester resin) emulsion, an acryl-styrene resin emulsion, a styrene-butadiene resin emulsion, a styrene-butadiene-latex emulsion, a vinyl acetate resin emulsion, an ethylene-vinyl acetate resin emulsion, an ethylene-acryl resin emulsion, an epoxy resin emulsion, an urethane resin emulsion, a phenol resin emulsion, a polyester resin emulsion and an acrylonitrile-butadiene-latex emulsion, and the MFT, the minimum film forming temperature of above-described entire resin emulsion is within a range of 5 to 15° C. and it contains one or more than two kinds of organic chemicals which boiling point is within a range of 150 to 240° C. for a film forming assistant in total 0.5% to 5% by weight.

Additionally, regarding an organic chemical for a film forming assistant, it is possible to use one or more than two kinds of following ethers, esters, glycols, glycol ethers or alcohols: an ethylene glycol mono-t-butyl ether, an ethylene a glycol mono propyl ether, a dimethyl dicarboxylate, a di-propylene glycol n-butyl ether, a 3-methyl-3-methoxy butanol, a propylene glycol, a 2-butoxy ethanol and so on.

Furthermore, for an inorganic filler, it enables to use a calcium carbonate, a magnesium carbonate, a barium sulfate, a clay, a talc, a mica, a diatomaceous earth, an aluminous, a gypsum, a cement, a slag powder, a white sand sediment powder, a glass powder, a graphite, a vermiculite, a kaolinite, a zeolite and so on.

As a result of an accomplishment of keen and hard study and experiments by this inventors, they have finally found that in case it contains one or more than two kinds of organic chemicals total within a range of 0.5% to 5% by weight which MFT, the minimum film forming temperature of the entire resin emulsion is within a range of 5 to 15° C. and the boiling point is within a range of 150 to 240° C. for a film forming assistant, it shows an excellent film forming property even if it leaves at low environment within a range of 5 to 20° C. Even in a subsequent baking drying also, it does not generate a defective coated film like swellings and they found that it brings out an excellent damping performance within a range of 20 to 60° C. On the basis of this finding, this present invention has been completed.

That is, in case the minimum film forming temperature of the entire resin emulsion is within a range of 5 to 15° C., even if it leaves at low temperature at 5° C. over 48 hours after applying emulsion paint type damping coatings, it does not generate a defective coated film like swellings and shows an excellent film forming property, and in case the boiling point of a film forming assistant is within a range of 150 to 240° C., it does not generate a defective coated film like swellings even after a baking drying also. Moreover, when the composition quantity of a film forming assistant is less than 0.5% by weight, it cannot be found an effect of a film forming assistant, but on the other hand, when the composition quantity of a film forming assistant is over 5% by weight, it generates swellings even in baking drying also.

Furthermore, in emulsion paint type damping coatings according to claim 1, a resin emulsion is one or more than two kinds of the following components: an acryl resin (including methacryl resin) emulsion, an acrylic ester resin (including methacrylic ester resin) emulsion, an acryl-styrene resin emulsion, a styrene-butadiene resin emulsion, a styrene-butadiene-latex emulsion, a vinyl acetate resin emulsion, an ethylene-vinyl acetate resin emulsion, an ethylene-acryl resin emulsion, an epoxy resin emulsion, an urethane resin emulsion, a phenol resin emulsion, a polyester resin emulsion, an acrylonitrile-butadiene-latex emulsion.

As the minimum film forming temperature (MFT) of these resin emulsions each is within a range of 5 to 15° C., by mixing these resin emulsions separately, it enables to obtain an emulsion paint type damping coating that brings out an excellent film forming property even when it leaves at low temperature from 5 to 20° C. Also, if it mixes one or more than two kinds of these resin emulsions, as long as the entire MFT, the minimum film forming temperature is within a range of 5 to 15° C., it enables to obtain an emulsion paint type damping coating that brings out an excellent film forming property same as even when it leaves at low temperature from 5 to 20° C.

At this point, the composition quantity of these resin emulsions is desired to be 18% to 26% by weight in entire emulsion paint type damping coatings converted at resin content (solid content). Moreover, it is much favorable to be 20% to 24% by weight.

Thus, in after coating to before ustulation, it shows en excellent film forming property and does not generate splits or cracks on a coated film even if it leaves at low temperature from 5 to 20° C. Besides, in baking drying also, it does not generate a defective coated film like swellings and becomes an emulsion paint type damping coating that brings out an excellent damping performance within a range of 20 to 60° C.

In emulsion paint type damping coatings according to claim 2, a film forming assistant is chosen at least one from following components: an ethylene glycol mono-t-butyl ether (boiling point: 153° C.), a diethylene glycol mono butyl ether (boiling point: 230° C.), a diethylene glycol mono ethyl ether (boiling point: 203° C.), an ethylene glycol mono propyl ether (boiling point: 150° C.), a dimethyl dicarboxylate (boiling point: 196 to 225° C.), a di-propylene glycol n-butyl ether (boiling point: 229° C.), a 3-methyl-3-methoxy butanol (boiling point: 174° C.), a propylene glycol (boiling point: 187° C.) and a 2-butoxy ethanol (boiling point: 168° C.).

As the boiling point of these organic chemicals is within a range of 150 to 240° C. each as described above, it forms an excellent coated film after application of emulsion paint type damping coatings. That is, in case the boiling point is less than 150° C., it does not obtain enough effect for a film forming assistant since it vaporizes the most part while it leaves at normal temperature before ustulation. On the other hand, when the boiling point is over 240° C., it remains in a coated film during ustulation and deteriorates the damping performance. Therefore, the boiling point of a film forming assistant is necessary to be within a range of 150 to 240° C.

Thus, in after coating to before ustulation, it shows an excellent film forming property and does not generate splits or cracks on a coated film even if it leaves at low temperature from 5 to 20° C. Besides, in baking drying also, it does not generate a defective coated film like swellings and becomes an emulsion paint type damping coating that brings out an excellent damping performance within a range of 20 to 60° C.

In emulsion paint type damping coatings according to claim 3, an inorganic filler is chosen at least one from following components: a calcium carbonate, a magnesium a carbonate, a barium sulfate, a clay, a talc, a mica, a diatomaceous earth, an aluminous, a gypsum, a cement, a slag powder, a white sand sediment powder, a glass powder, a graphite, a vermiculite, a kaolinite and a zeolite.

Particularly, it is preferred to be chosen at least one from a barium sulfate, a clay, a talc, a mica and a diatomaceous earth for an inorganic filler. As these inorganic fillers are cheap, easily-available each and go well with a resin emulsion, by mixing into emulsion paint type damping coatings, it enables to not only lower production cost of emulsion paint type damping coatings but also obtain an excellent damping performance.

At this point, the composition quantity of these inorganic fillers is desired to be 40% to 60% by weight in entirely emulsion paint type damping coatings. Moreover, it is much favorable to be 45% to 55% by weight.

Thus, in after coating to before ustulation, even if it leaves at low temperature from 5 to 20° C., it shows an excellent film forming property and does not generate splits or cracks on a coated film. Besides, in baking drying also, it does not generate a defective coated film like swellings and becomes an emulsion paint type damping coating that brings out an excellent damping performance within a range of 20 to 60° C.

DESCRIPTION OF CODES

1: emulsion paint type damping coatings
1A, 1B: damping coated film

BEST MODES TO EMBODY THE INVENTION

Figure 1:
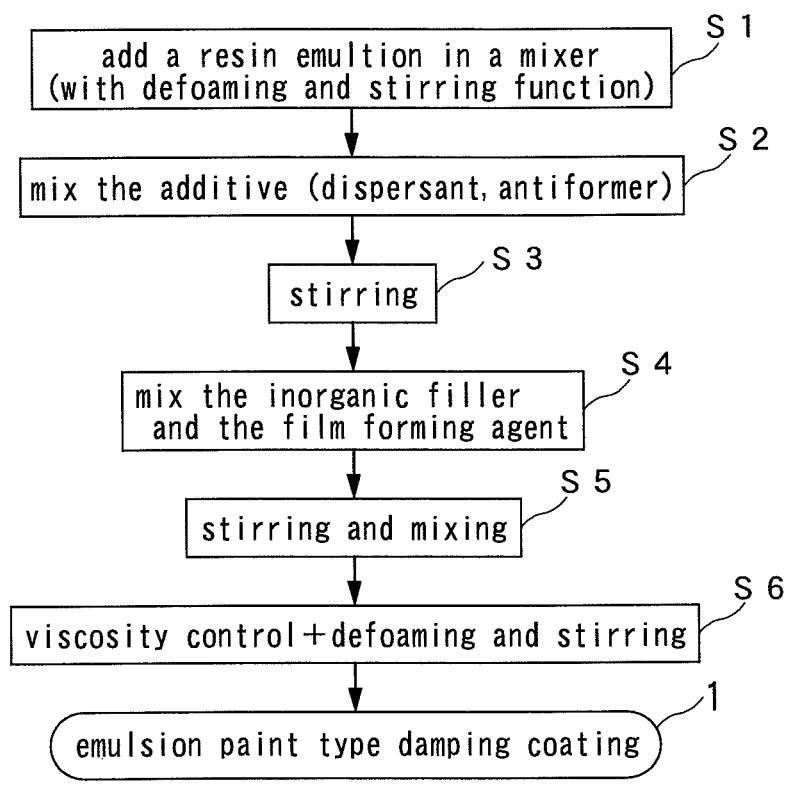
FIG. 1 is a flow chart showing a production method of emulsion paint type damping coatings according to this embodiment.
Figure 2A:
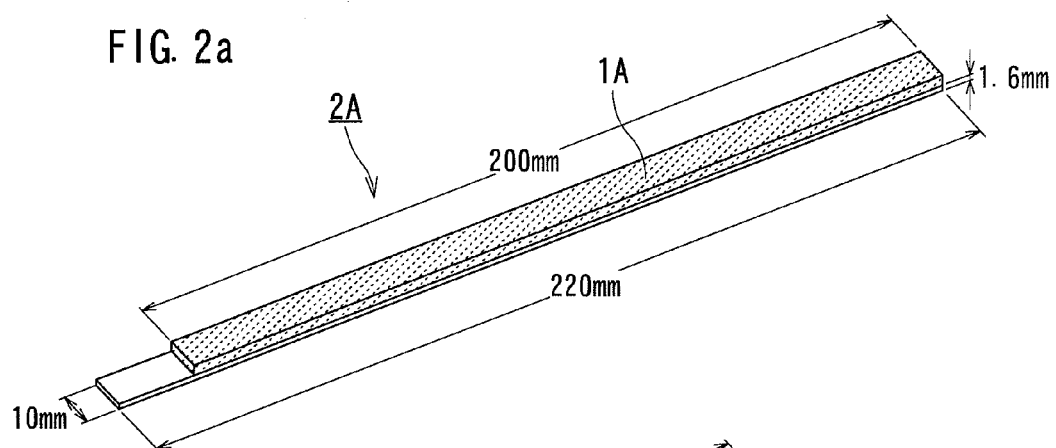
FIG. 2a is a perspective view showing a trial product to test a damping performance of a coated film formed by emulsion paint type damping coatings according to this embodiment.
Figure 2B:
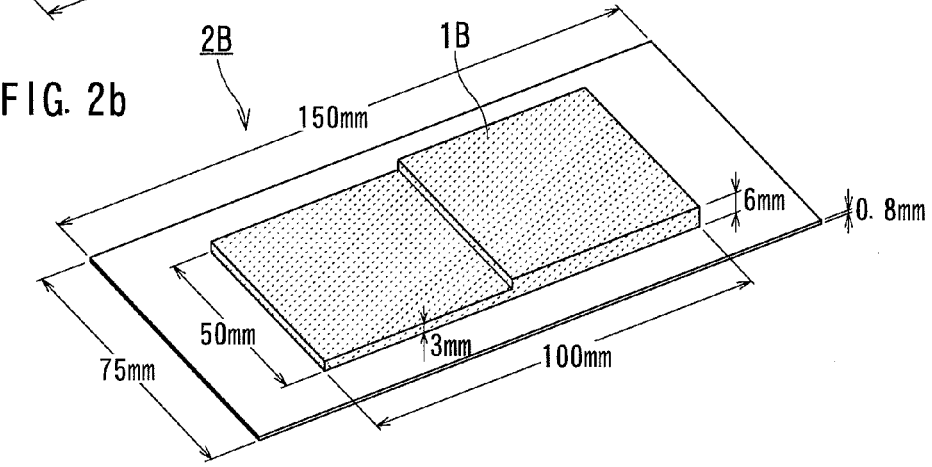
FIG. 2b is a perspective view showing a trial product to test a film forming property of a coated film.

Hereinafter, emulsion paint type damping coatings according to embodiment of this present invention is described with referent to FIG. 1 and FIG. 2. FIG. 1 is a flow chart showing a production method of emulsion paint type damping coatings according to this embodiment. FIG. 2a is a perspective view showing a trial production so as to test a damping performance of a coated film formed by emulsion paint type damping coatings according to this embodiment. FIG. 2b is a perspective view showing a trial product to test a film forming property of a coated film.

Production method of emulsion paint type damping coatings according to this embodiment is described referring to a flow chart, FIG. 1. As shown in FIG. 1, first, it immerses a liquid form resin emulsion into the mixer (with deforming and stirring function) at step 1. Then, it adds an additive (dispersant, anti deformer) at step 2 and stirs (step 3). Next, it immerses an inorganic filler and a film forming assistant into it (step 4), and stirs and mixes to combine it (step 5). Then, after fixing the viscosity, it deforms and stirs (step 6). In above process, the production of emulsion paint type damping coatings 1 is completed.

Next, the composition of emulsion paint type damping coatings according to this embodiment is described. For a resin emulsion, it used a resin emulsion A, B, C, D that regarded a methacrylic ester copolymer as a resin emulsion and used a resin emulsion E that regarded an acryl-styrene resin emulsion as a resin emulsion. For a film forming assistant, it used a glycol ester organic chemical F, a glycol ether organic chemical G, H, and an ester organic chemical I, J. Also, for an inorganic filler, it used mixture of a calcium carbonate, a barium sulfate, a talc, a mica and a diatomaceous earth.

Additionally, to fix a viscosity, it made total 100% by weight by mixing water and a thickener. It changed these compounding ratios and produced embodiment 1 to 9. Moreover, it produced a comparative example 1 to 10 for comparison as well and a characteristic test (damping performance, film forming property, presence or absence of swellings after ustulation) was done. Each composition of emulsion paint type damping coatings according to embodiment 1 to 9 and comparative example 1 to 10 is shown at the upper part of TABLE 1.

TABLE 1

| | | embodiment | | | | | | | | | comparison |
|---|---|---|---|---|---|---|---|---|---|---|---|
| | | 1 | 2 | 3 | 4 | 5 | 6 | 7 | 8 | 9 | 1 |
| emulsion resin | A | | | | | | | | | | 40 |
| | B | 40 | 40 | | | | | 40 | 40 | | |
| | C | | | | | | | | | 40 | |
| | D | | | 40 | 40 | 40 | 40 | | | | |
| | E | | | | | | | | | | |
| film forming | F | | | | | | | | | | 0.5 |
| assistant | G | | | | | 0.5 | 5 | | | | |
| | H | 0.5 | 5 | 0.5 | 5 | | | | | | |
| | I | | | | | | | 0.5 | 5 | 3 | |
| | J | | | | | | | | | | |
| damping | 20° C. | 0.11 | 0.13 | 0.10 | 0.11 | 0.09 | 0.13 | 0.12 | 0.13 | 0.09 | 0.15 |
| characteristic | 40° C. | 0.16 | 0.15 | 0.17 | 0.16 | 0.16 | 0.15 | 0.16 | 0.15 | 0.17 | 0.13 |
| (ratio of loss*1) | 60° C. | 0.07 | 0.06 | 0.10 | 0.09 | 0.11 | 0.06 | 0.06 | 0.04 | 0.09 | 0.03 |
| film forming | 5° C. shelf | ◯ | ◯ | ◯ | ◯ | ◯ | ◯ | ◯ | ◯ | ◯ | ◯ |
| characteristic | 20° C. shelf | ◯ | ◯ | ◯ | ◯ | ◯ | ◯ | ◯ | ◯ | ◯ | ◯ |

TABLE 1-continued

| | | | | | | | | | | |
|---|---|---|---|---|---|---|---|---|---|---|
| blister after heating*2 | 5° C. shelf | ○ | ○ | ○ | ○ | ○ | ○ | ○ | ○ | ○ |
| | 20° C. shelf | ○ | ○ | ○ | ○ | ○ | ○ | ○ | ○ | X |
| synthetic judgement | | ○ | ○ | ○ | ○ | ○ | ○ | ○ | ○ | X |

| | | comparison | | | | | | | | |
|---|---|---|---|---|---|---|---|---|---|---|
| | | 2 | 3 | 4 | 5 | 6 | 7 | 8 | 9 | 10 |
| emulsion resin | A | | | | | | | | | |
| | B | | 40 | 40 | | | | | | |
| | C | | | | | | 40 | 40 | 40 | 40 |
| | D | | | | 40 | 40 | | | | |
| | E | 40 | | | | | | | | |
| film forming assistant | F | | 0.5 | 5 | | | | | | |
| | G | | | | | | 0.4 | 6 | | |
| | H | | | | | | | | | |
| | I | | | | | | | | 0.4 | 6 |
| | J | 5 | | | 0.5 | 5 | | | | |
| damping characteristic (ratio of loss*1) | 20° C. | 0.12 | 0.11 | 0.11 | 0.11 | 0.12 | 0.11 | 0.12 | 0.12 | 0.13 |
| | 40° C. | 0.14 | 0.15 | 0.15 | 0.16 | 0.15 | 0.16 | 0.15 | 0.15 | 0.14 |
| | 60° C. | 0.06 | 0.08 | 0.07 | 0.07 | 0.03 | 0.07 | 0.04 | 0.06 | 0.04 |
| film forming characteristic | 5° C. shelf | X | X | X | X | ○ | X | ○ | X | ○ |
| | 20° C. shelf | ○ | X | ○ | ○ | ○ | X | ○ | X | ○ |
| blister after heating*2 | 5° C. shelf | X | ○ | ○ | ○ | ○ | ○ | X | ○ | X |
| | 20° C. shelf | ○ | ○ | ○ | ○ | ○ | ○ | X | ○ | X |
| synthetic judgement | | X | X | X | X | X | X | X | X | X | emulsion resin
A methacryl acid ester co-polymer MFT = 0° C.
B methacryl acid ester co-polymer MFT = 5° C.
C methacryl acid ester co-polymer MFT = 10° C.
D methacryl acid ester co-polymer MFT = 15° C.
E acryl-stylene resin MFT = 20° C.
film forming assistant
F glycol ester b.p.: 145° C.
G glycol ether b.p.: 150° C.
H glycol ether b.p.: 174° C.
I ester b.p.: 196~225° C.
J ester b.p.: 244° C.
*1 ratio of loss Generally, it is excellent damping material that ratio of loss is more than 0.04. (base thickness: 1.6 mm)
*2 heating 120° C.~160° C. × 30 min~120 min
-explanatory notes-
film foeming characteristic: ○: no clack, X: clack
blister after heating: ○: no blister, X: blister As shown in TABLE 1, through each composition of embodiment 1 to 9 and comparative example 1 to 10, it standardizes the composition of a resin emulsion (a methacrylic ester copolymer emulsion or an acryl-styrene resin emulsion) at 40% by weight all. Regarding these resin emulsions A, B, C, D, E, as the composition of resin content is 55% and water is 45% each, the composition converted at resin content (solid content) is 22% by weight all.

Moreover, it is not shown in TABLE 1, but it also standardizes the composition of an inorganic filler at 51% by weight all. As its breakdown, there are 35% by weight of a calcium carbonate, 8% by weight of a barium sulfate, 3% by weight of a diatomaceous earth, 2% by weight of a talc and 3% by weight of a mica. Additionally, it uses an anionic polycarboxylic sodium salt for dispersion and the composition is standardized at 0.5% by weight all. Also, the compositions of an anti former and a dispersant are standardized as total 1% by weight all. Then, it immerses water that is used to add for viscosity modification at step 6 of FIG. 1 into the water included in a resin emulsion A, B, C, D, E (18% by weight to the total weight of the composition) and makes a condition that water is 18% to 20% by weight to the total and made the amount 100% by weight.

Therefore, in each composition of embodiment 1 to 9 and comparative example 1 to 10, the difference is only a type of a resin emulsion shown in TABLE 1, a type and a composition of a film forming assistant and these combinations.

As shown in TABLE 1, in embodiment 1 and 2, it uses a methacrylic ester copolymer B (MFT=5° C.) for a resin emulsion and uses a glycol ether organic chemical H (boiling point: 174° C.) for a film forming assistant. However, there is a difference only in the composition of a film forming assistant showed 0.5% by weight and 5 by weight. In embodiment 3 to 6, it uses a methacrylic ester copolymer D (MFT=15° C.) for a resin emulsion and uses a glycol ether organic chemical H (boiling point: 174° C.) for a film forming assistant in embodiment 3 and 4. In embodiment 5 and 6, it uses a glycol ether organic chemical G (boiling point: 150° C.) for a film forming assistant. Then, the difference is only seen in composition of a film forming assistant as 0.5% by weight and 5 by weight each.

Also, in embodiment 7 and 8, it uses a methacrylic ester copolymer B (MFT=5° C.) same as embodiment 1 and 2, and for a film forming assistant, it uses an ester organic material I (boiling point: 196 to 225° C.). However, only the composition of a film forming assistant is different that shows 0.5% by weight and 5 by weight each. Then, in embodiment 9, it uses a methacrylic ester copolymer C (MFT=10° C.) for a resin emulsion and mixes 3% by weight of an ester organic material I (boiling point: 196 to 225° C.) for a film forming assistant.

Therefore, in emulsion paint type damping coatings according to embodiment 1 to 9, it meets following all the requirements that "MFT, the minimum film forming temperature of the entire resin emulsion is within a range of 5 to 15° C. and it contains organic materials within a range of 0.5% to 5% by weight in total and the boiling point for a film coating material is within a range of 150 to 240° C." according to claim 1 of this present invention.

On the other hand, in comparative example 1, it uses a methacrylic ester copolymer A (MFT=0° C.) for a film forming assistant and uses 0.5% by weight of a glycol ester organic material F (boiling point: 145° C.), and the MFT of a resin emulsion and the boiling point of a film forming assistant are also varied from a condition according to claim 1 of this present invention. In comparative example 2, it uses an acryl-styrene resin emulsion E (MFT=20° C.) for a resin emulsion and uses 5% by weight of an ester organic chemical J (boiling point: 244° C.) for a film forming assistant. At the same time, the MFT of a resin emulsion and the boiling point of a film forming assistant are also varied from a condition according to claim 1 of this present invention.

Also, in comparative example 3 and 4, it uses a methacrylic ester copolymer B (MFT=5° C.) for a resin emulsion same as embodiment 1 and 2. However, for a film forming assistant, it uses 0.5% by weight and 5% by weight of a glycol ester organic chemical F (boiling point: 145° C.) each and the boiling point of a film forming assistant is varied from a condition according to claim 1 of this present invention. In comparative example 5 and 6, it uses a methacrylic ester copolymer D (MFT=15° C.) for a resin emulsion same as embodiment 3 to 5. However, for a film forming assistant, it uses 0.5% by weight and 5% by weight of a glycol ester organic chemical J (boiling point: 244° C.) each and the boiling point of a film forming assistant is varied from a condition according to claim 1 of this present invention all the same.

In comparative example 7 to 10, it uses a methacrylic ester copolymer C (MFT=10° C.) for a resin emulsion same as embodiment 9, and in comparative example 7 and 8, it uses a glycol ester organic chemical G (boiling point: 150° C.) for a film forming assistant same as embodiment 5 and 6. Also, in comparative 9 and 10, it uses an ester organic chemical I (boiling point: 196 to 225° C.) same as embodiment 7 to 9. However, the composition of a film forming assistant is 0.4% by weight or 6% by weight and it is varied from a condition (within a range of 0.5% to 5% by weight) according to claim 1 of this present invention.

Therefore, in emulsion paint type damping coatings according to comparative 1 to 10, it does not meet more than one out of the following requirements that "MFT, the minimum film forming temperature of the entire resin emulsion is within a range of 5 to 15° C. and it contains organic materials within a range of 0.5% to 5% by weight in total and the boiling point for a film coating material is within a range of 150 to 240° C." according to claim 1 of this present invention.

Next, a method of characteristic test of a coated film formed by applying emulsion paint type damping coatings according to these embodiment 1 to 9 and comparative example 1 to 10 is described referring to FIG. 2. The exam is about damping performance, film forming property and presence or absence of swellings after ustulation each.

A dumping performance test as shown in FIG. 2a was done using a trial production 2A that was formed by barcaoter coating of emulsion paint type damping coatings in square of 200 mm in height and 10 mm in width on the surface of an anti-rusting steel sheet, which is 220 mm in height, 10 mm in width and 1.6 mm in thickness. Additionally, the thickness of a coated film 1A is applied so that dry-film weight per unit area becomes 4 kg per square meter and it has completed the trial production 2A by barcoater coating twice that was done at 130° C. for 30 minutes each. In this trial production 2A, it measured a loss factor at 20° C., 40° C. and 60° C. each. Generally, in case of this trial product 2A with thickness 1.6 mm, it is determined as one that has an excellent damping performance in case the loss factor is over 0.04.

Also, as shown in FIG. 2b, each test in film forming property and presence or absence of swellings after ustulation using a trial product 2B that is formed a coated film 1B by barcaoter coating of emulsion paint type damping coatings with length 100 mm and width 50 mm on the surface of 150 mm in height, 75 mm in width and 0.8 mm in thickness electrophoretic coating steel sheet. The thickness of a coated film 1B is divided into two parts, 3 mm and 6 mm and the condition of ustulation is done at 120 to 160° C. for 30 to 120 minutes.

Regarding a film forming property, a trial production 2B shown in FIG. 2b is left at 5° C. and 20° C. for 48 hours and if it does not generate splits onto the surface of the substrate electroretic coating steel sheet, it evaluates ◯, and if it generates splits there, it evaluates X. Also, regarding swellings after ustulation, after it leaves a trial production 2B at 5° C. and 20° C. for 48 hours as described above, ustulation is done at 120 to 160° C. for 30 to 120 minutes. In this condition, if it does not generate swellings on a coated film 1B, it evaluates ◯, and if it generates swellings there, it evaluates X. The result of each exam in the damping performance, the film forming property and presence or absence of swellings after ustulation is described at the lower part of TABLE 1.

As shown at the lower part of TABLE 1, in emulsion paint type damping coatings composed according as embodiment 1 to 9, each loss factor at 20° C., 40° C. and 60° C. is within a range of 0.04 to 0.17 and all the loss factor is over 0.04. Thus, it found that there had an excellent damping performance within a range of 20 to 60° C. Also, regarding a film forming property and swellings after ustulation, it was evaluated ◯ in all of the condition as well. Therefore, emulsion paint type damping coatings composed according as embodiment 1 to 9 are all evaluated ◯ at the comprehensive determination.

On the other hand, in composition of comparative example 1, the loss factor at 60° C. is only 0.03 that is shortage of damping performance and it generates subsequent ustulation swellings after leaving at 20° C. for 48 hours. In composition of comparative example 2, it meets a standard of damping performance but it also generates splits to the subsequent and swellings after ustulation leaving at 5° C. for 48 hours. Moreover, in composition of comparative example 3, it meets a standard of damping performance but generates splits to the subsequent after leaving at 5° C. and 20° C. for 48 hours.

Also, regarding composition of comparative example 4 and 5, it meets a standard of the damping performance but generates splits to the subsequent after leaving at 5° C. for 48 hours. Moreover, regarding composition of comparative example 6, it meets all the standard of a film forming property and swellings after ustulation, but the loss factor at 60° C. is only 0.03 that is shortage of a damping performance. Also, regarding composition of comparative example 7 and 9 composed less film forming assistant, it generates splits onto the surface of the subsequent after leaving at 5° C. and 20° C. for 48 hours each. On the other hand, regarding composition of comparative example 8 and 10 composed much film forming assistant, it generates swellings after ustulation respectively.

Therefore, emulsion paint type damping coatings according to composition of comparative example 1 to 10 are evaluated X at the comprehensive determination all.

As above-described, in emulsion paint type damping coatings according to embodiment 1 to 9, it shows an excellent film forming property even if it leaves at low temperature from 5 to 20° C. in after coating to before ustulation, it does not generate splits or cracks on a coated film and does not generate a defective coated film like swellings even if in a subsequent baking drying and brings out an excellent damping performance within a range of 20 to 60° C.

Therefore, emulsion paint type damping coatings according to this embodiment (1 to 9) enable an automated construction on a floor portion, a trunk room, a dash portion and so on of a vehicle by use of a painting robot and the like. As it barely contains a volatile organic compound (VOC), it is environmentally-enhancing and enables not only to obtain an excellent coated film that has a high damping performance but also to lower the production cost.

In this embodiment, it is described an example used a methacrylic ester copolymer emulsion for a resin emulsion, which MFT is 5 to 15° C. Moreover, it is also available to use the following components that MFT is 5 to 15° C.: an acryl resin (including methacryl resin) emulsion, an acryl-styrene resin emulsion, a styrene-butadiene resin emulsion, a styrene-butadiene-latex emulsion, a vinyl acetate resin emulsion, an ethylene-vinyl acetate resin emulsion, an ethylene-acryl resin emulsion, an epoxy resin emulsion, an urethane resin emulsion, a phenol resin emulsion, a polyester resin emulsion, an acrylonitrile-butadiene-latex emulsion and so on.

Also, according to this embodiment, examples used a glycol ether organic chemical G, H, and an ester organic chemical I which boiling points are within a range of 150 to 240° C. are described. Moreover, it is available to use an ethylene glycol mono-t-butyl ether (boiling point: 153° C.), a diethylene glycol mono butyl ether (boiling point: 230° C.), a diethylene glycol mono ethyl ether (boiling point: 203° C.), a di-propylene glycol n-butyl ether (boiling point: 229° C.), a 3-methyl-3-methoxy butanol (boiling point: 174° C.), a propylene glycol (boiling point: 187° C.), a 2-butoxy ethanol (boiling point: 168° C.) and so on.

Furthermore, according to this embodiment, it enables to use mixture of a calcium carbonate, a barium sulfate, a talc, a mica, a diatomaceous earth for an inorganic filler. However, it is possible to use these by itself or use as more than two kinds of mixture as well. In addition, it is able to use a magnesium carbonate, a clay, an aluminous, a gypsum, a cement, a slag powder, a white sand sediment powder, a glass powder, a graphite, a vermiculite, a kaolinite and a zeolite by itself or can use them as mixture as well.

Other composition of emulsion paint type damping coatings, component, quantity, material, size, production method and so on are not be considered limited to this embodiment also. Additionally, numerical numbers in this embodiment are not shown a critical value and it shows an excellent numerical number to embodiment. Therefore, even if there have a slightly change to above numerical numbers, it is not to be considered denied embodiment.

The invention claimed is:

1. An emulsion paint type damping coating comprising:
a resin emulsion having a total amount within a range of 18% to 26% by weight,
an organic film forming assistant having a total amount within a range of 0.5 to 5% by weight, and
an inorganic filler;
wherein the resin emulsion is selected from at least one of a (meth)acrylic resin emulsion, a (meth)acrylic ester resin emulsion, an acryl-styrene resin emulsion, a styrene-butadiene resin emulsion, a styrene-butadiene-latex emulsion, a vinyl acetate resin emulsion, an ethylene-vinyl acetate resin emulsion, an ethylene-acryl resin emulsion, an epoxy resin emulsion, a urethane resin emulsion, a phenol resin emulsion, a polyester resin emulsion and an acrylonitrile-butadiene-latex emulsion,
the minimum film forming temperature of the resin emulsion is within a range of 5 to 15° C.,
the boiling point of the film forming assistant is within a range of 150 to 240° C., and
wherein the film forming assistant is selected from at least one of an ethylene glycol mono-t-butyl ether, an ethylene glycol mono propyl ether, a dimethyl dicarboxylate, a 3-methyl-3-methoxy butanol, and a 2-butoxy ethanol.

2. The emulsion paint type damping coating according to claim 1, wherein the filler is selected from at least one of a calcium carbonate, a magnesium carbonate, a barium sulfate, a clay, a talc, a mica, a diatomaceous earth, an aluminous, a gypsum, a cement, a slag powder, a white sand sediment powder, a glass powder, a graphite, a vermiculite, a kaolinite and a zeolite.

3. The emulsion paint type damping coating according to claim 1, wherein the total amount of all the resin emulsions to be mixed in the emulsion paint type damping coating is within a range of 20% to 24% by weight.

4. The emulsion paint type damping coating according to claim 3, wherein the inorganic filler is mixed within a range of 45% to 55% by weight in the emulsion paint type damping coating.

5. The emulsion paint type damping coating according to claim 1, wherein the film forming assistant is selected from at least one of an ethylene glycol mono-t-butyl ether, an ethylene glycol mono propyl ether, a dimethyl dicarboxylate, and a 3-methyl-3-methoxy butanol.

* * * * *